(12) United States Patent
Forman (10) Patent No.: US 7,290,650 B2
(45) Date of Patent: Nov. 6, 2007

(54) METHODS OF MAGNETIC CONVEYOR SUPPORT

(76) Inventor: Jon Forman, 8821 VanBuren St. NE., Blaine, MN (US) 55434

( * ) Notice: Subject to any disclaimer, the term of this patent is extended or adjusted under 35 U.S.C. 154(b) by 0 days.

(21) Appl. No.: 11/616,752

(22) Filed: Dec. 27, 2006

(65) Prior Publication Data

US 2007/0108024 A1 May 17, 2007

Related U.S. Application Data

(60) Continuation of application No. 11/263,690, filed on Nov. 1, 2005, now Pat. No. 7,159,708, which is a division of application No. 10/732,718, filed on Dec. 10, 2003, now Pat. No. 6,971,507.

(51) Int. Cl.
*B65G 21/20* (2006.01)
(52) U.S. Cl. .................................................... 198/805
(58) Field of Classification Search ............... 198/805, 198/841, 690.1
See application file for complete search history.

(56) References Cited

U.S. PATENT DOCUMENTS

| | | |
|---|---|---|
| 3,497,056 A | 2/1970 | Clark |
| 3,908,816 A | 9/1975 | Brain |
| 4,051,946 A | 10/1977 | Buccicone |
| 4,130,206 A | 12/1978 | Buccicone |
| 4,180,257 A | 12/1979 | Buccicone |
| 4,337,598 A | 7/1982 | Barth et al. |
| 4,792,036 A | 12/1988 | Heidelberg |
| 4,823,939 A | 4/1989 | Langhans et al. |
| 5,027,942 A | 7/1991 | Wallaart |
| 5,052,309 A | 10/1991 | Haselwander et al. |
| 5,128,569 A | 7/1992 | Gladish |
| 5,161,676 A | 11/1992 | Gunther et al. |
| 5,172,803 A | 12/1992 | Lewin |
| 5,251,741 A | 10/1993 | Morishita et al. |
| 5,295,570 A | 3/1994 | Grecksch et al. |
| 5,398,804 A | 3/1995 | Ecker et al. |
| 5,441,458 A | 8/1995 | Rogus |
| 6,129,201 A | 10/2000 | Langhans |
| 6,155,406 A | 12/2000 | Garbagnati |
| 6,510,941 B2 | 1/2003 | Schermutzki et al. |
| 2006/0081448 A1 | 4/2006 | Fandella |

OTHER PUBLICATIONS

M.J. Dunn Company, "CB-504 Style Belt Conveyor Idler & Pulley Catalog," Catalog #6, Jun. 2001, 40 sheets.

*Primary Examiner*—James R. Bidwell
(74) *Attorney, Agent, or Firm*—Crompton, Seager & Tufte, LLC (57) ABSTRACT

Apparatuses designed to provide support to a conveyor belt in a new manner. In a first illustrative embodiment, a conveyor belt is supported by a number of magnets. A first set of magnets are disposed on the edges of the conveyor belt, and a second set of magnets are disposed on a support apparatus for the conveyor belt. The first and second sets of magnets interact to create repulsive forces that provide both lateral and vertical support to the conveyor belt. Tension provided by the lateral forces can help the belt move smoothly and with less wear than the support provided by existing support idlers.

20 Claims, 13 Drawing Sheets

METHODS OF MAGNETIC CONVEYOR SUPPORT

CROSS REFERENCE TO RELATED APPLICATIONS

This application is continuation of U.S. application Ser. No. 11/263,690, filed Nov. 1, 2005, now U.S. Pat. No. 7,159,708; which is a divisional of U.S. application Ser. No. 10/732,718, filed Dec. 10, 2003, now U.S. Pat. No. 6,971,507; the entire disclosures of which are both incorporated herein by reference.

FIELD

The present invention is related to the field of materials conveyance. More particularly, the present invention relates to the field of conveyer devices.

BACKGROUND

Conveyor belts are used to move materials in a wide variety of industries and environments. Some such conveyor belts are used, for example, in moving ore within a mine, gravel or rocks within a quarry, and in a variety of industrial applications where bulk materials are moved.

Figure 1:
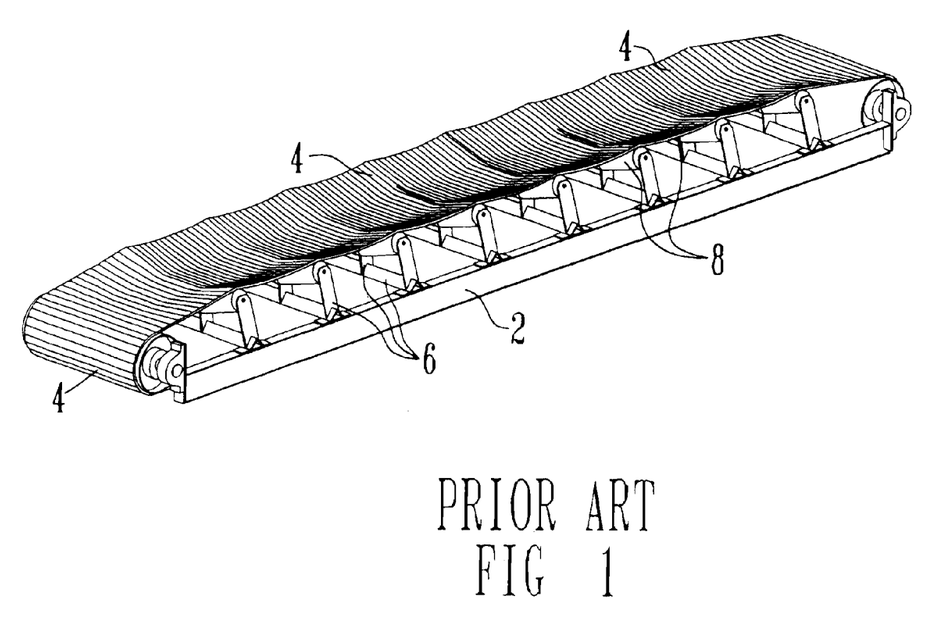
FIG. 1 is a perspective view of an illustrative prior art conveyor.

FIG. 1 illustrates a prior art conveyor. The conveyor includes a conveyor framework 2 which may be made, for example, using channel, angle-iron, trusswork, or a variety of other configurations. A conveyor belt 4 is supported by support idler frames 6 which include a number of support idler rollers 8. Driving force may be applied by any number of methods/apparatuses, including, for example, creating a turning force at the rollers shown on the end of the framework 2, or by application of force using magnets on the conveyor belt 4 itself which interact with stators placed relative the edges of the conveyor belt 4.

Figure 2:
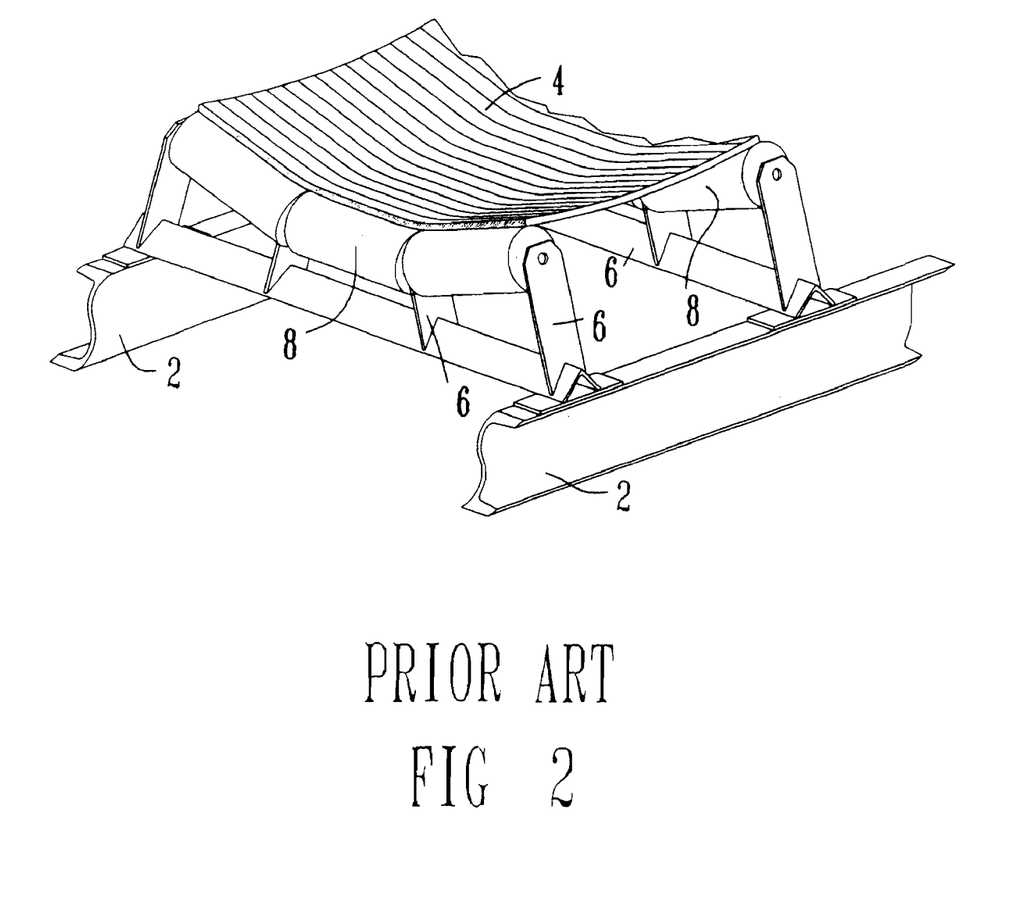
FIG. 2 is a cutaway view highlighting a portion of the illustrative prior art conveyor of FIG. 1.

FIG. 2 shows a closer, cut-away view of a prior art conveyor, highlighting the conveyor belt 4, idler support 6, and idler rollers 8. As shown, the idler rollers 8 are angled with respect to one another such that the conveyor belt 4 forms a trough in which a material to be conveyed rests during transport. The idler supports 6 are secured relative the conveyor framework 2. There is a slight sag between the rollers 8, and it can be seen that the conveyor belt 4 does not pass smoothly over the rollers 8, instead being shaped thereby with slight angular form.

The conveyor belt 4 is typically constructed as a relatively flat, flexible member having a first end and a second end, where the ends are secured together to create a loop by the use of a securing apparatus. In a simplest form, the conveyor belt 4 has two ends coupled together by interacting teeth or interleaved loops, where a wire, for example, is passed through the interleaved loops to secure the first end of the conveyor belt 4 to the second end of the conveyor belt 4. Other forms, such as vulcanized "endless" belts may also be used. Any number of individual sections may be pieced together in this or another suitable manner to build the conveyor belt 4.

One of the limitations of such prior art conveyor support designs is that the supportive force of the rollers 8 causes localized strain on the conveyor belt 4, wearing the conveyor belt 4. Further, the rollers 8 are subject to wear and degradation, and require periodic replacement. The rollers 8 include internal bearings that occasionally wear out, and with the large number of moving parts, the overall system is subject to failure in harsh environments.

SUMMARY

The present invention, in an illustrative embodiment, includes apparatuses designed to provide support to a conveyor belt in a new manner. In a first illustrative embodiment, a conveyor belt is supported by a number of magnets. A first set of magnets are disposed on the edges of the conveyor belt, and a second set of magnets are disposed on a support apparatus for the conveyor belt. The first and second sets of magnets interact to create repulsive forces that provide both lateral and vertical force to the conveyor belt.

DETAILED DESCRIPTION

The following detailed description should be read with reference to the drawings. The drawings, which are not necessarily to scale, depict illustrative embodiments and are not intended to limit the scope of the invention.

Figure 3:
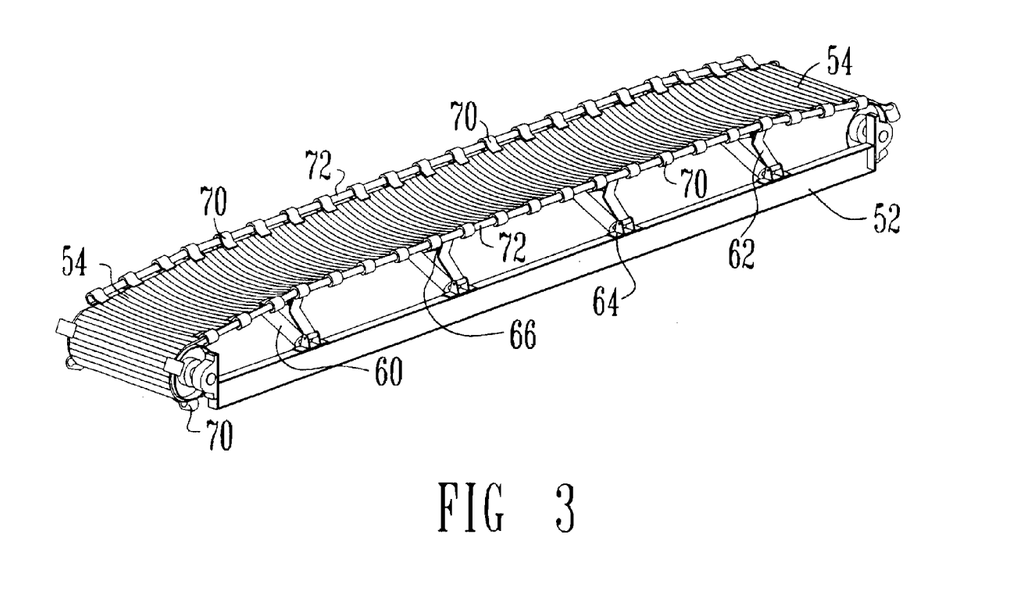
FIG. 3 is a perspective view of a first embodiment of a magnetically supported conveyor system.

FIG. 3 is a perspective view of a first embodiment of a magnetically supported conveyor system. The system includes a conveyor framework 52 that is used with a conveyor belt 54. The system includes tension members 60 and several support arms 62 that are secured to the conveyor framework 52 by several support pivot mounts 64. Several upper pivot mounts 66 are also included.

The conveyor belt 54 is at least partly supported by the use of magnetic forces. In particular, a number of outer magnet housings 70 are secured to the conveyor belt 54. The conveyor belt 54 is then suspended between two inner magnet housings 72. As illustrated in greater detail below, the outer magnet housings 70 and inner magnet housings 72 interact magnetically. Repulsive forces between the outer magnet housings 70 and inner magnet housings 72 support the conveyor belt 54.

Figure 4:
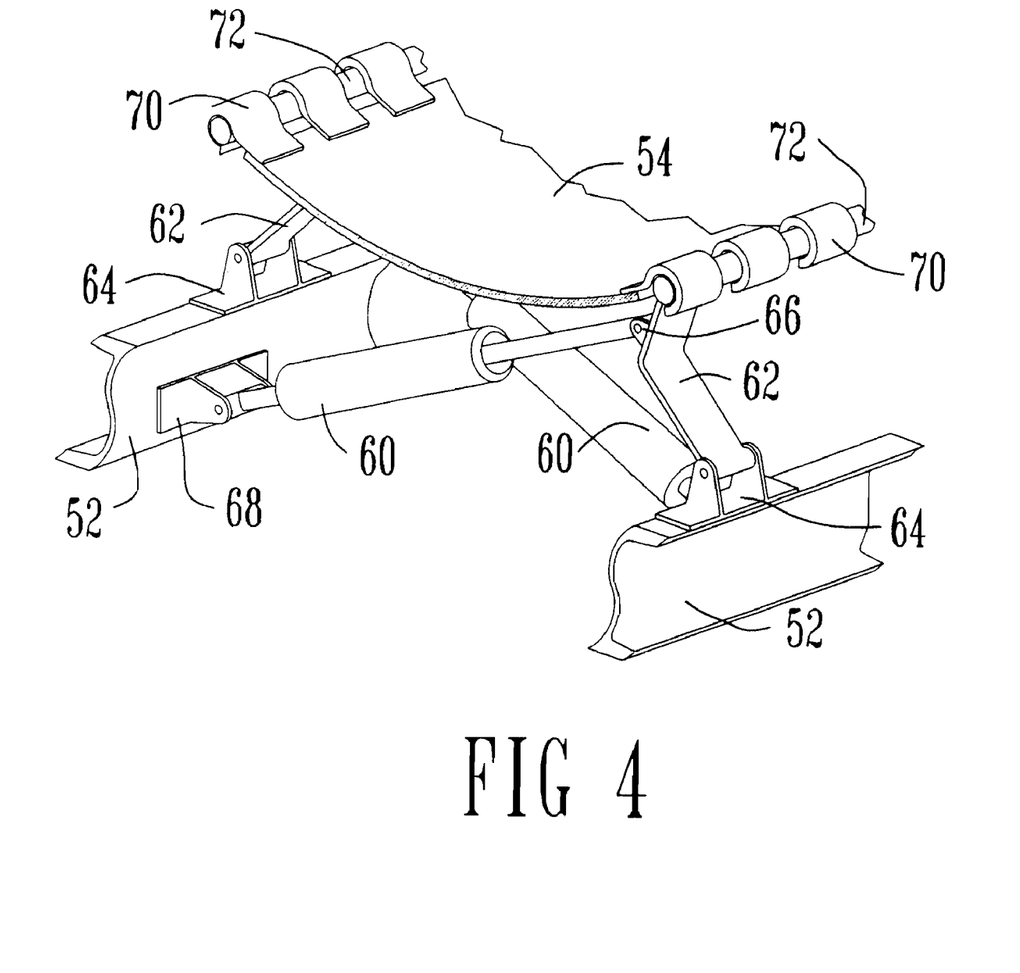
FIG. 4 is a section view of an illustrative embodiment showing greater detail of the supporting framework for a magnetically supported conveyor system.

FIG. 4 is a section view of an illustrative embodiment showing greater detail of the supporting framework for a magnetically supported conveyor system. The conveyor framework 52 is secured by a lower pivot mount 68 to the tension member 60, which is in turn secured to the support arm 62 by the upper pivot mount 66. The support arm 62 is also secured to the conveyor framework by support pivot mounts 64.

As can be seen, the outer magnet housings 70 wrap around the inner magnet housing 72 so that both lateral and vertical support is provided to the conveyor belt 54. The conveyor belt 54 is held in position under lateral tension. The weight of whatever material is carried the conveyor belt 54 will cause the conveyor belt 54 to sag in the middle. As the conveyor belt 54 sags, more material can be carried by the conveyor up to a point, however, too much sag can reduce capacity and cause excessive wear on the conveyor belt 54. To prevent too much sag from occurring, tension members 60 are provided between the support arms 62. If the conveyor belt 54 is empty, less wear on the conveyor belt 54 occurs when it runs flat, so the tension members 60 are also adapted to cause the conveyor belt 54 to run flat when empty, yet allow some sag to occur as the conveyor belt 54 is loaded. The tension members 60 may include a stop preventing too much sag from occurring, for example, to keep the conveyor belt 54 from coming into contact with the tension members 60. If desired or necessary, additional support devices may be used in conjunction with the magnetic support provided by the magnet housings 70, 72. The several pivot mounts 64, 66, 68 allow the conveyor belt 54 to go from a sagging configuration to a flat position (and the reverse) smoothly and easily.

Figure 5:
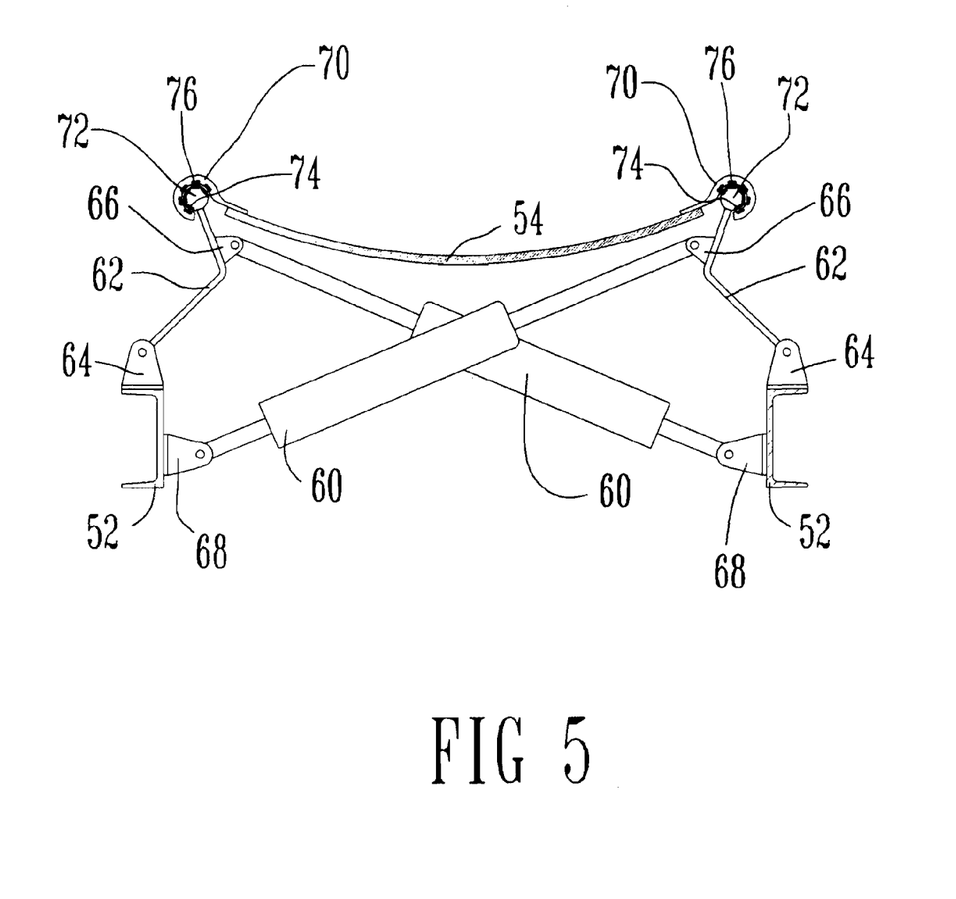
FIG. 5 is a cross-sectional view of an illustrative support framework.

FIG. 5 is a cross-sectional view of an illustrative support framework. The cross section shows how the tension members 60 cross from the lower pivot mounts 68 to the upper pivot mounts 66 to provide lateral support to the support arms 62. The support pivot mounts 64 allow the support arms 62 to move with respect to the conveyor framework 52, allowing the conveyor belt 54 to have lateral flexibility.

Also illustrated is how the outer magnet housing 70 at least partly surrounds the inner magnet housing 72. The outer magnet housing 70 contains outer magnets 76, which interact with inner magnets 74 contained by the inner magnet housing 72. The outer magnets 76 are all aligned in similar polarity, as are the inner magnets 74, such that the outer magnets 76 collectively repel the inner magnets 74. The conveyor belt 54 thus moves on a cushion of air with decreased wear and friction.

While the preferred embodiments of the present invention include magnets 74, 76 that create a cushion of air between the inner and outer housings, other configurations are also contemplated. For example, frictional contact between the inner and outer housings may be allowed in some embodiments. If desired a lubricant (wet or dry) may be provided between the inner and outer housings to make movement with contact easier.

Additionally, the magnets 74, 76 may provide primary or supplemental support to a conveyor belt. For example, if desired, the magnets 74, 76 may be sufficient to provide guiding forces to a belt, wherein the magnets 74, 76 and tension members 60 are sufficient to keep the belt relatively flat while the belt is running empty, but when the belt is loaded the belt is allowed to deform and move generally as shown in FIG. 1, with rollers disposed longitudinally between the tension members. By allowing the belt to run relatively flat while unloaded, friction and wear are reduced, while rollers may be provided to give additional support when the belt is heavily loaded.

In several embodiments additional support devices may be provided as well. For example, an impact cradle or bed such as an impact slider bed may be provided beneath the belt 54 at a location corresponding to a hopper or loading area. The impact slider bed may include, for example, a slippery hard plastic upper layer over a cushioned layer. One example impact slider bed includes a number of elongate members that run longitudinally beneath a portion of the belt 54, each elongate member having at least two layers, with the upper layer being a slippery plastic about $\frac{1}{3}$ the thickness of the member, and a lower layer made up of a relatively soft, cushioning rubber that covers approximately $\frac{2}{3}$ of the thickness of the member. If desired, a spring or rigid support, such as a piece of iron or steel, may hold up the elongate members.

Figure 6:
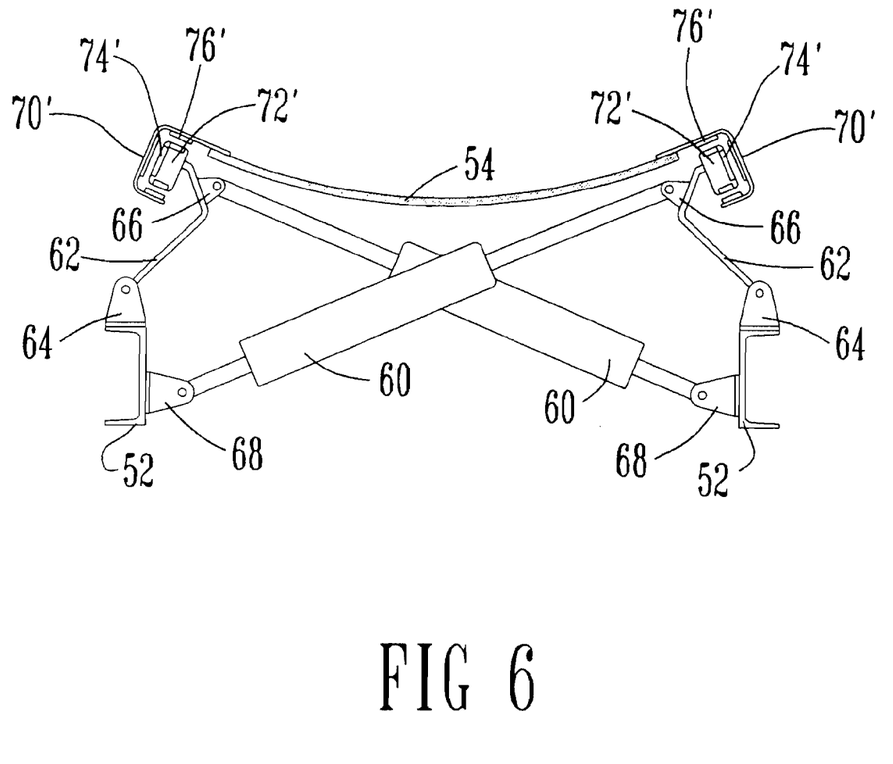
FIG. 6 is a cross-sectional view of another illustrative support framework.

FIG. 6 is a cross-sectional view of another illustrative support framework. Again, the tension members 60 are coupled to the support legs 62 and conveyor framework 52 using upper and lower pivot mounts 66, 68. The support legs 62 themselves are coupled to the conveyor framework by the support pivot mounts 64. The main difference from FIG. 5 to FIG. 6 is in the shape of the outer magnet housing 70' and inner magnet housing 72'. Rather than a curved shape (as shown by the magnet housings 70, 72 in FIG. 5), the magnet housings 70', 72' in FIG. 6 are rectangular. By using the rectangular shape, the inner magnets 74' may be disposed differently, for example, the upper magnet of the inner magnets 74' may have a N/S polarity where the N pole is up, and the lower magnet may have the same alignment, so that the upper and lower magnets of the inner magnet attract one another and hold each other in place, yet repel the outer magnets 76'.

Figure 7:
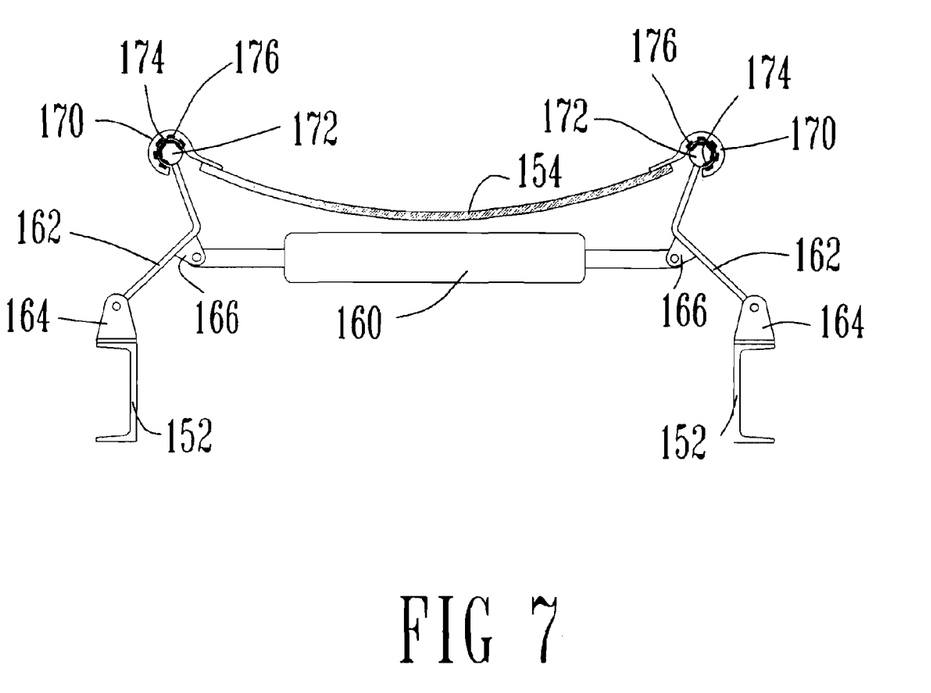
FIG. 7 is a cross-sectional view of yet another illustrative support framework.

FIG. 7 is a cross-sectional view of yet another illustrative support framework. A conveyor framework 152 is used to support a conveyor belt 154 as follows. Support arms 162 are secured to the conveyor framework by support pivot mounts 164. A tension member 160 is coupled to the support arms 162 using arm pivot mounts 166. The tension member 160 is configured to push the support arms 162 apart, keeping the conveyor belt 154 under tension. The tension member 160 configured as shown simplifies the overall design, however, as illustrated, the conveyor belt 154 is not allowed to sag as far as it otherwise might, since the tension member 160 is in the way.

The conveyor belt 154 is coupled to the support arms 162 by the use of an outer magnet housing 170 that is disposed about an inner magnet housing 172. The repulsive magnetic forces between the inner magnets 174 and outer magnets 176 creates an air gap that allows the conveyor belt 154 to move without significant friction caused either by support along its edges or friction creating by passage over idler rollers.

Figure 8:
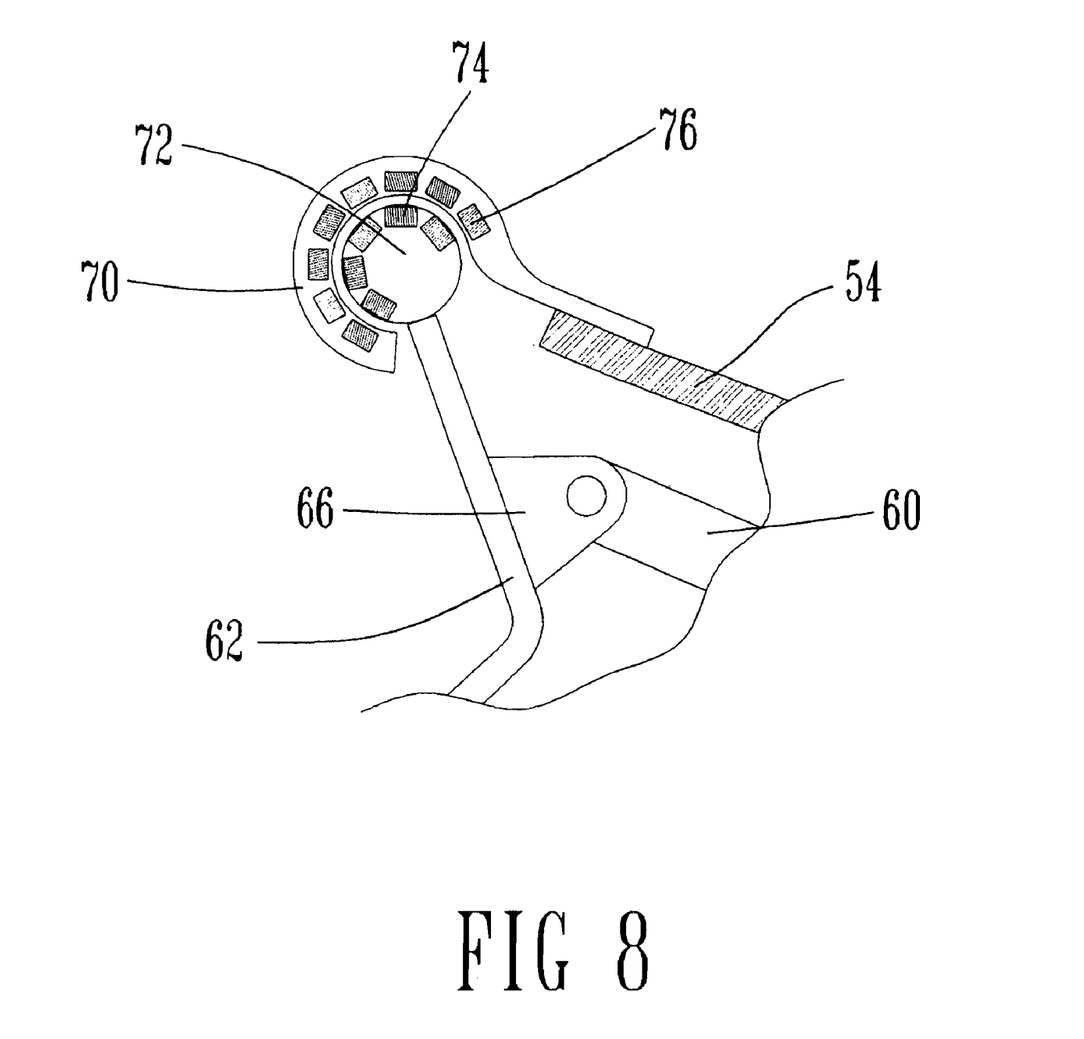
FIG. 8 illustrates in detail a magnetic layout for a magnetically supported conveyor system.

FIG. 8 illustrates in detail a magnetic layout for a magnetically supported conveyor system. The configuration corresponds to that illustrated in FIG. 5. The tension member 60 pushes the arm 62 outward through its connection to the upper pivot mount 66. In turn, the arm transmits both vertical and lateral forces to the inner magnet housing 72 containing a number of inner magnets 74. Preferably, each of the inner magnets 74 is orientated with the same field polarity facing outside. The outer magnet housing 70 contains several outer magnets 76, which preferably are orientated to each have the same field polarity facing inside. The field polarity facing inside for the outer magnets 76 is preferably the same as the field polarity facing outside for the inner magnets 74, such that the outer magnets 76 and inner magnets 74 repel one another.

Figure 9:
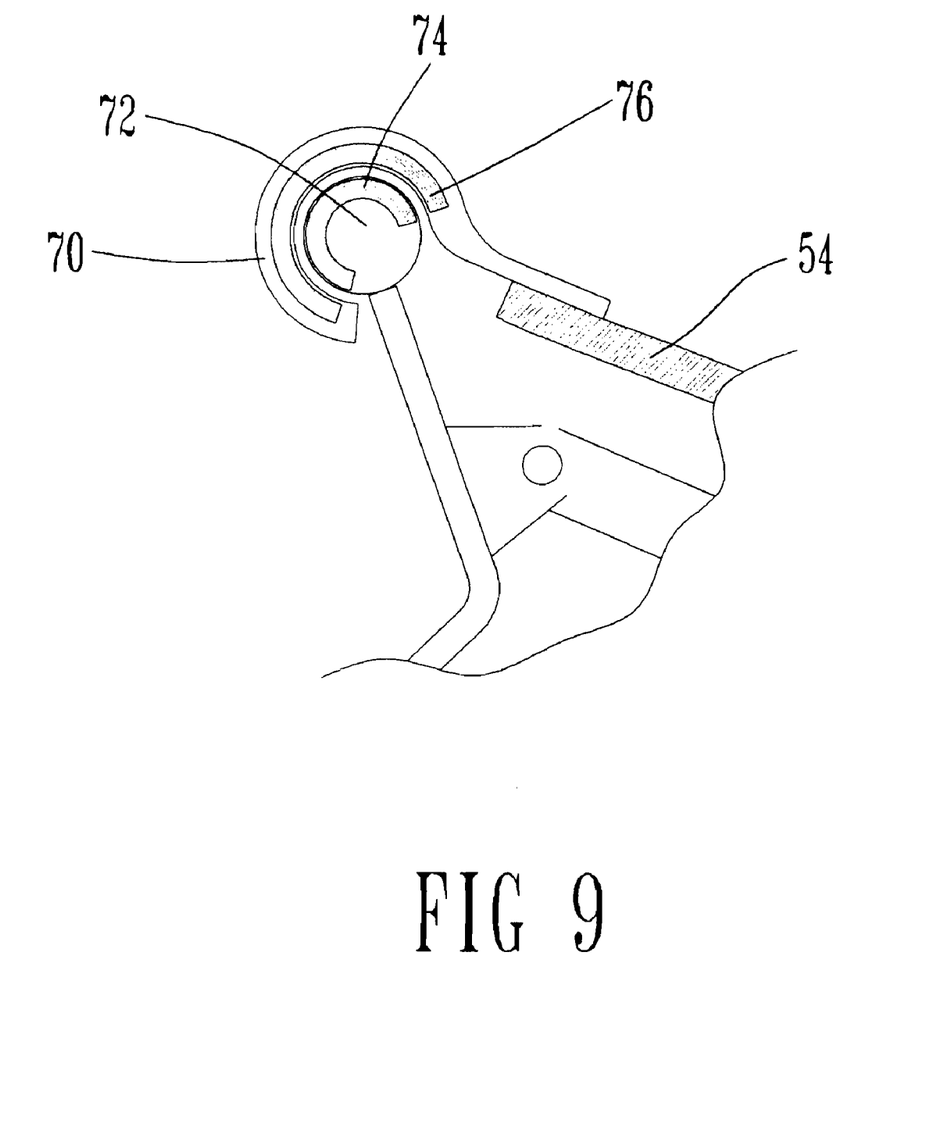
FIG. 9 illustrates in detail another magnetic layout for a magnetically supported conveyor system.

FIG. 9 illustrates in detail another magnetic layout for a magnetically supported conveyor system. The inner magnets 74 comprise a single magnet, and the outer magnets 76 are also a single magnet. If desired, one or both of the magnets may be an electro-magnet that is coupled to a source of electricity such that, when the electricity is on, the magnetic field generated by at least one of the magnets 74, 76 is boosted. Then, if desired, the electricity could be cut off when the belt 54 is not moving, reducing the resting tension on the belt 54.

Figure 10:
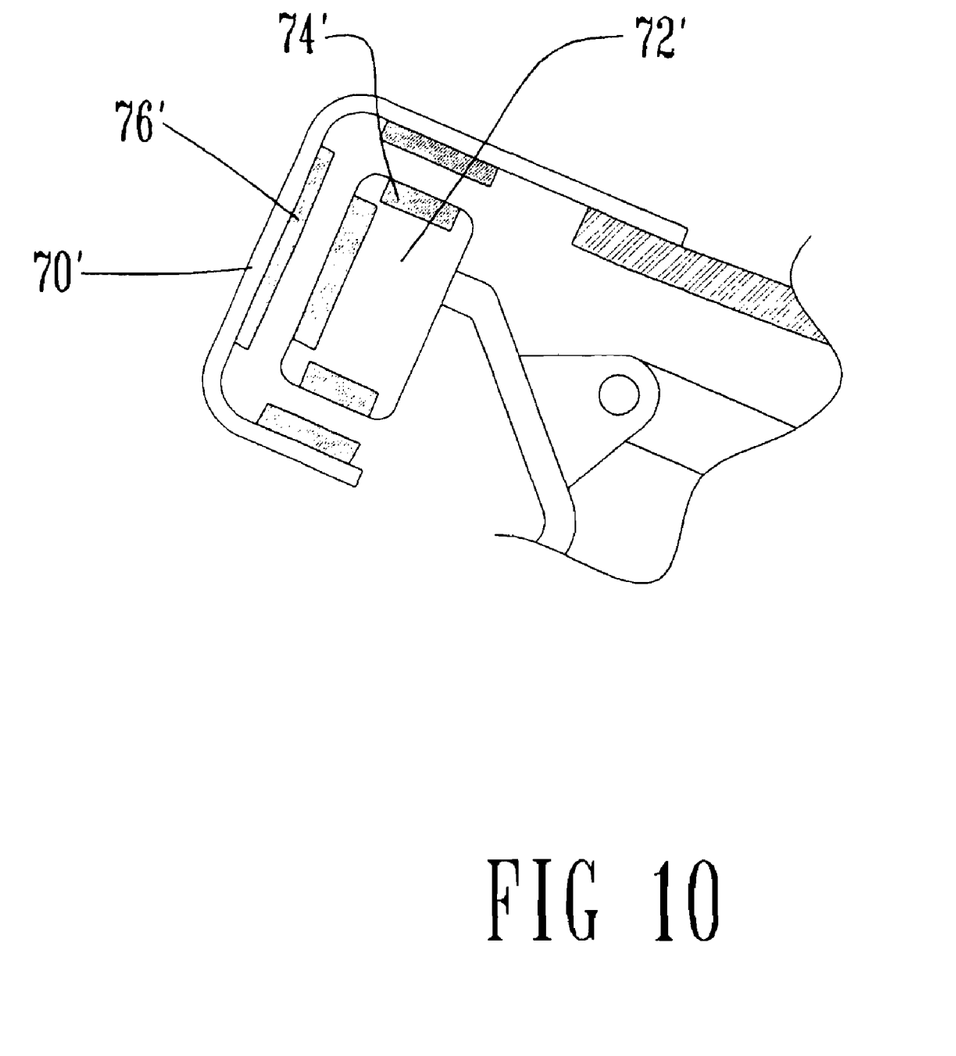
FIG. 10 illustrates a rectangular magnetic layout for a magnetically supported conveyor system.

FIG. 10 illustrates a rectangular magnetic layout for a magnetically supported conveyor system. The outer magnet housing 70' is shaped to preserve an air cushion around the inner magnet housing 72'. The inner magnets 74' are oriented and disposed to provide a repulsive force with respect to the outer magnets 76'.

Figure 11:
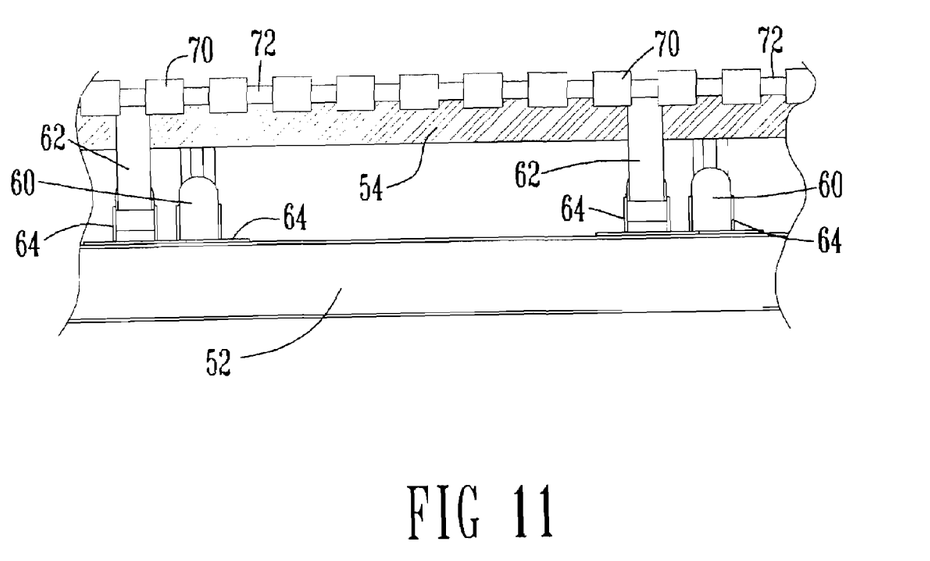
FIG. 11 shows, in side view, a portion of a magnetically supported conveyor system.

FIG. 11 shows, in side view, a portion of a magnetically supported conveyor system. The system may include a number of outer housing structures 70 disposed about an inner housing structure 72 to support the conveyor belt 54. The conveyor belt 54 is supported over a conveyor framework 52 by the use of several support arms 62 that may be spaced or alternated as shown. The support arms 62 are secured between the conveyor framework 52 and the conveyor belt 54 by support pivot mounts 64. Tension members 60 may attach to the support arms 62 as noted above.

The conveyor belt 54 may be motivated by any suitable mechanism or device. Pulley and/or roller systems, along with geared devices having teeth that engage the conveyor belt 54 may be used. Several magnet and stator systems may also be used, for example.

Figure 12:
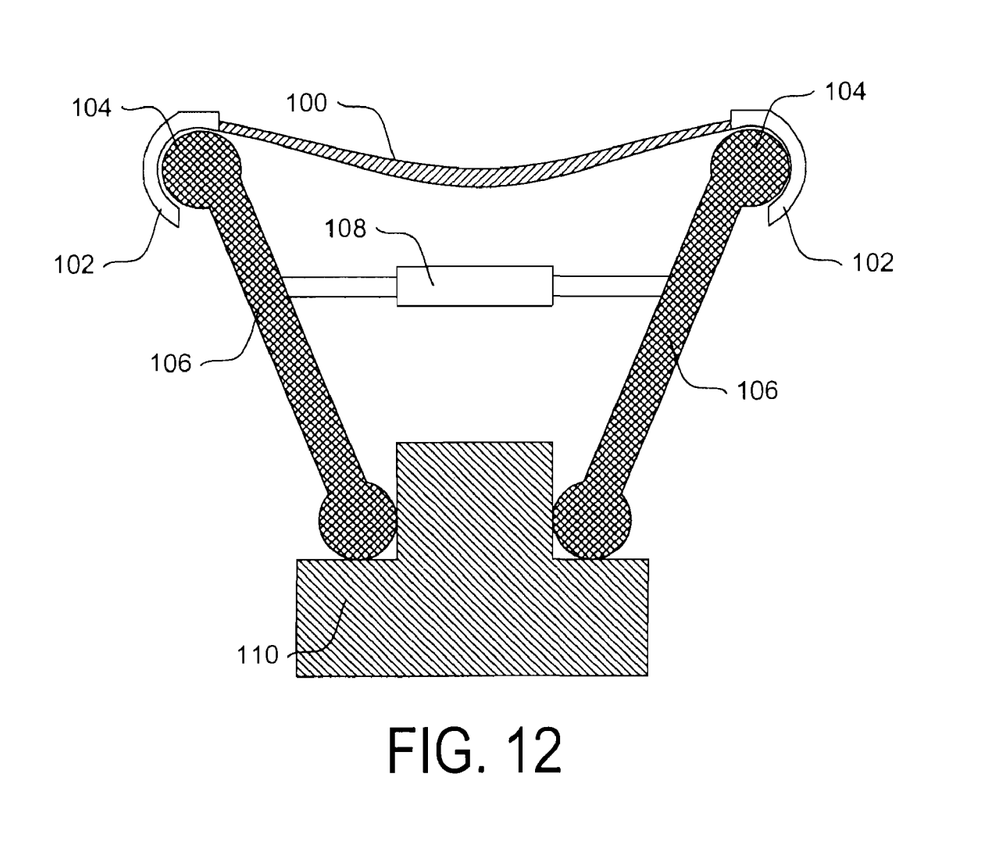
FIG. 12 is a cross-sectional view of another illustrative support framework.

FIG. 12 is a cross-sectional view of another illustrative support framework. The support framework supports a conveyor belt 100 using outer magnetic housings 102 and inner magnetic housings 104. The housings 102, 104 may be as outlined above. The support arms 106 are tensioned, laterally, by a tension member 108. Rather than two side-by-side frame members having a number of cross members therebetween (such a support framework would be used with several of the above embodiments), the illustrative framework in FIG. 12 makes use of a single central member 110. Because the support arms 106 angle outward with respect to the central member 110, the force of gravity creates tension across the conveyor belt 100. As such the conveyor belt 100 tends to run flat when unloaded.

The tension member 108 may provide pushing forces between the support arms 106 when the conveyor belt 100 is heavily loaded. For example, if the conveyor belt 100 is heavily loaded, troughing in the middle will tend to pull the support arms 106 together, so the tension member 108 may provide a pushing force to prevent over-troughing of the conveyor belt 100.

Figure 13:
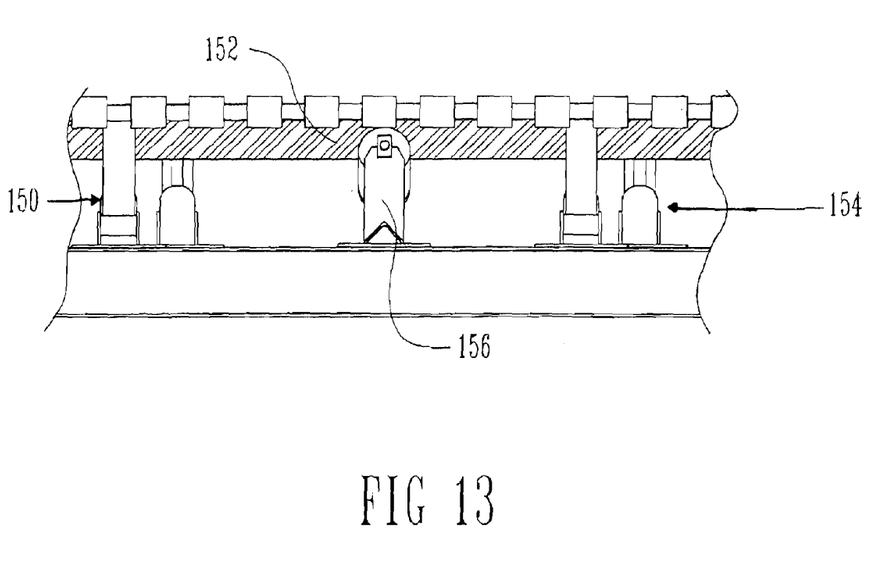
FIG. 13 is a side view of another illustrative conveyor system.

FIG. 13 is a side view of another illustrative conveyor system. The system is similar to that shown in FIG. 11, with a first magnetic support structure shown generally at 150 for belt 152, and a second magnetic support structure shown generally at 154. Between the magnetic support structures is a roller-type structure, as shown generally at 156.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A method of using a conveyor belt comprising:
providing lateral and vertical support to the conveyor belt using magnetic forces;
conveying a material with the conveyor belt; and
varying at least the lateral support in response to the load provided by the material.

2. A method of using a conveyor belt comprising:
providing lateral and vertical support to the conveyor belt using magnetic forces; and
conveying a material with the conveyor belt;
wherein the step of providing lateral and vertical support to the conveyor belt is performed using magnets disposed along lateral edges of the conveyor belt in combination with magnets disposed on a support structure for the conveyor belt.

3. The method of claim 2, wherein the magnets disposed along the lateral edges and the magnets disposed on the support structure repel one another to provide both lateral and vertical support.

4. The method of claim 2, wherein the support structure includes first and second arm having first ends that allow pivoting movement and second ends that support the magnets on the support structure.

5. The method of claim 4, wherein the material is conveyed on a surface of the conveyor belt and the first and second arms are located beneath the surface of the conveyor belt that is used for conveying the material.

6. The method of claim 5, wherein the first and second arms include second ends opposite their respective first ends, and the support structure includes means for biasing the second ends of the first and second arms away from one another.

7. The method of claim 2, wherein the support structure further includes at least one set of rollers for providing vertical support to the conveyor belt.

8. A method of using a conveyor belt comprising:
providing a support structure for the conveyor belt including first and second arms having first ends having pivotal mounts and second ends opposite the first ends, the support structure also including a biasing member that biases the second ends of the first and second arms away from one another;
providing lateral and vertical support to the conveyor belt using magnetic forces generated between magnets disposed on lateral edges of the conveyor belt and magnets supported by the first and second arms; and
conveying a material with the conveyor belt.

9. The method of claim 8, wherein the magnets disposed along the lateral edges and the magnets disposed on the support structure repel one another to provide both lateral and vertical support.

10. The method of claim 8, wherein the material is conveyed on a surface of the conveyor belt and the first and second arms are located beneath the surface of the conveyor belt that is used for conveying the material.

11. The method of claim 8, wherein the support structure further includes at least one set of rollers for providing vertical support to the conveyor belt.

12. A method of supporting a conveyor belt comprising:
providing first and second arms each having first ends pivotally mounted to one another and second ends away from the fist ends;
providing means for biasing the second ends of the first and second arms away from one another;
providing one or more support engaging devices at the second ends of the first and second arms;

providing one or more belt engaging devices on lateral edges of the conveyor belt; and using the support engaging devices and the belt engaging devices to provide lateral and vertical support to the conveyor belt.

13. The method of claim 12, wherein the support engaging devices and the belt engaging devices are magnetic devices.

14. The method of claim 12, wherein the support engaging devices and the belt engaging devices generate repelling magnetic forces therebetween.

15. The method of claim 1, wherein the step of providing lateral and vertical support to the conveyor belt is performed using magnets disposed along lateral edges of the conveyor belt in combination with magnets disposed on a support structure for the conveyor belt.

16. The method of claim 15, wherein the magnets disposed along the lateral edges and the magnets disposed on the support structure repel one another to provide both lateral and vertical support.

17. The method of claim 15, wherein the support structure includes first and second arm having first ends that allow pivoting movement and second ends that support the magnets on the support structure.

18. The method of claim 17, wherein the material is conveyed on a surface of the conveyor belt and the first and second arms are located beneath the surface of the conveyor belt that is used for conveying the material.

19. The method of claim 18, wherein the first and second arms include second ends opposite their respective first ends, and the support structure includes means for biasing the second ends of the first and second arms away from one another.

20. The method of claim 15, wherein the support structure further includes at least one set of rollers for providing vertical support to the conveyor belt.

* * * * *